(12) United States Patent
Rosenqvist

(10) Patent No.: US 7,835,077 B2
(45) Date of Patent: Nov. 16, 2010

(54) MICROSCOPE SYSTEM COMPRISING ARRANGEMENT FOR POSITIONING OF A PLATFORM

(75) Inventor: Anders Rosenqvist, Södra Sandby (SE)

(73) Assignee: Cellavision AB, Lund (SE)

( * ) Notice: Subject to any disclaimer, the term of this patent is extended or adjusted under 35 U.S.C. 154(b) by 546 days.

(21) Appl. No.: 11/628,058

(22) PCT Filed: May 26, 2005

(86) PCT No.: PCT/SE2005/000783

§ 371 (c)(1),
(2), (4) Date: Nov. 30, 2006

(87) PCT Pub. No.: WO2005/119329

PCT Pub. Date: Dec. 15, 2005

(65) Prior Publication Data

US 2008/0030851 A1    Feb. 7, 2008

(30) Foreign Application Priority Data

Jun. 1, 2004    (SE) ................ 0401388

(51) Int. Cl.
*G02B 21/26* (2006.01)
(52) U.S. Cl. .................... 359/393
(58) Field of Classification Search ........ None
See application file for complete search history.

(56) References Cited

U.S. PATENT DOCUMENTS

| 4,565,094 A * | 1/1986 | Sedgewick ............ 73/866.5 |
| 4,635,887 A | 1/1987 | Hall et al. |
| 4,688,908 A | 8/1987 | Moore |
| 6,121,599 A * | 9/2000 | Traber ............ 250/208.1 |
| 6,341,180 B1 | 1/2002 | Pettersson et al. |
| 6,720,551 B2 | 4/2004 | Cleveland et al. |

FOREIGN PATENT DOCUMENTS

| DE | 3301658 | 8/1983 |
| DE | 196 50 392 | 2/1998 |
| WO | WO 01/11407 | 2/2001 |
| WO | WO 02/39059 | 5/2002 |
| WO | WO 02/084368 | 10/2002 |

OTHER PUBLICATIONS

Machine translation of DE 3301658.*
European Office Action dated Jul. 5, 2010.

\* cited by examiner

*Primary Examiner*—Stephone B Allen
*Assistant Examiner*—Derek S Chapel
(74) *Attorney, Agent, or Firm*—Harness, Dickey & Pierce, P.L.C.

(57) ABSTRACT

In a flexure arrangement for translating positioning of an object in a microscope system, two actuators both act along a first direction, while the object partly can be positioned along the first direction and partly, with a gear ratio, along the second direction, which is perpendicular to the first.

17 Claims, 5 Drawing Sheets

MICROSCOPE SYSTEM COMPRISING ARRANGEMENT FOR POSITIONING OF A PLATFORM

FIELD OF THE INVENTION

The present invention relates to an arrangement for positioning in, for instance, microscoping.

BACKGROUND ART

In microscopic analyses of various medicinal preparations, for instance what is referred to as differential counting of white blood cells, it is possible to use automatic scanning microscope systems. One example of such a microscope system is DiffMaster™ Octavia from CellaVision AB, which automatically scans a blood smear which is positioned on the surface of a microscope slide. During scanning, the microscope system must be able to perform, inter alia, controlled positioning movements of the microscope slide in what is below referred to as the x/y plane whose normal is the optical axis of the microscope.

The range, i.e. the size of the scannable area, in x and y is usually slightly smaller than that of the microscope slide, which is about 1 by 3 inches. The resolution of such positioning movements can now be allowed to have a minimum resolution which is tens of a micrometer. The fact that as much as tens of a micrometer can be allowed largely depends on the progress in image analysis and quick jointless assembling of partial images that has been made in recent years. WO 02/084368, A1 discloses, inter alia, a method in scanning microscoping, which solves the problem of scanning a preparation and later returning to found partial objects also with a microscope where the positioning movements have a relatively high minimum resolution even if they are not quite repeatable.

Scanning of the preparation often occurs in a meandering pattern where the x position is changed basically in each movement and where the y position is changed only when the x position has come close to one of the edges of the microscope slide. For the speed of the microscope, the speed of the x positioning is therefore more important than that of the y positioning.

To be able to focus the image of, for instance, a blood cell to a sharp image on an image sensor in a camera, the scanning microscope must also be able to make controlled changes of the mutual distance between the objective of the microscope and the microscope slide. Such changes in distance usually occur exclusively along the optical axis, below referred to as the z axis, and can, depending on the depth of field of the objective used, have to be so small as 0.1 micrometer, i.e. smaller than a whole wavelength of visible light in vacuum. The range in z must be about a millimeter, depending on how plane the microscope slide is and how perpendicularly to the optical axis the positioning in x/y occurs.

It is further desirable that the automatic scanning microscope will quickly have finished its tasks. For quick and reliable scanning of a preparation, it is not enough to use an image sensor with a large number of picture elements, which gives a great surface coverage per image, or an image sensor with a high image frequency. The speed of the system is also dependent on the scanning microscope having a positioning system which can quickly move the preparation to new desired positions, both perpendicular to and along the optical axis. Many of the positioning movements in a DiffMaster™ Octavia system are associated with fine focusing on found cells. 200 cells per preparation at five focusing movements per cell may be involved. The images of the cells are taken by a CCD sensor with a shutter setting in the order of 1 millisecond, where each pixel in the image corresponds to about 0.1 micrometer on the preparation, which means that the preparation must basically be absolutely immovable during exposure. For each 10 milliseconds that the system oscillates after a focusing movement, a waiting time of about $200 \cdot 5 \cdot 0.01$ s=10 s will be added to the time it otherwise takes for the microscope to analyse the preparation. It is therefore particularly important that the positioning system can make quick z movements of exactly the desired length, with fundamentally no play when changing the direction of movement and with minimum post-oscillations in x, y and z. As discussed above, it matters less, however, where in a range of for instance ($\pm 5$ μm, $\pm 5$ μm, $\pm 0.05$ μm) in (x, y, z) the preparation is immovable.

The speed of the scanning microscope is also dependent on whether the microscope, in terms of image analysis, has access to one or more focusing methods which allow it to use few camera images on each fine focusing occasion. Such focusing principles will not be discussed here but are described, for instance, in U.S. Pat. No. 6,341,180, WO 01/11407, A2 and WO 02/39059, A1.

In addition the requirements as to range, resolution, speed and stability of the positioning movements, there are also requirements as to the production and service costs for a commercially useful positioning system.

There are already a number of known ways of implementing x/y/z positioning systems for scanning microscopes. The various ways of implementation differ from each other, among other things, by which storing principles they use. An ideal bearing principle allows a part journalled in bearings to make the desired movements fundamentally without the presence of friction, while at the same time it holds the stored part, without play, along the other dimensions. The various ways of implementation also differ from each other by what actuators and gear mechanisms they use to perform the desired movements. The known ways of implementing x/y/x positioning systems result in different compromises regarding satisfying all the above-mentioned requirements.

In many cases the implementation of the x/y/z positioning system is divided into an x/y part and a z part, i.e. in a part for movements perpendicular to the optical axis and in a part for movements along the optical axis.

A common way of implementing the x/y positioning is to motorise the traditional microscope stage that is to be found in most microscope stands even in the basic design. Repeatability and resolution are in most cases far better than the about 10 micrometers that are mentioned as a desideratum above, which does in fact not add much extra value to the positioning system of a scanning microscope. However, the linear bearings and actuators in the form of stepping motors with so-called ball bearing screws that are used make the microscope stages expensive to manufacture. Owing to their solid structure, the traditional microscope stages have relatively large movable masses and will therefore have relatively slow acceleration as the speed is changed and also relatively long post-oscillations at a great amplitude for tens of milliseconds.

A common way of implementing the z positioning is to motorise the shaft for the manual wheel in the traditional microscope mechanism which allows the objective, and an optional revolver, to be translated in the z direction relative to the stand of the microscope, also referred to as the frame. There are several drawbacks of this way of motorisation. First, microscope frames are relatively expensive. Second, the z mechanisms are in most cases not completely free of play in their gear mechanisms when changing the direction of movement, which results in less predictable real movements in connection with fine focusing, thus requiring unnecessarily many movements. The purchase price of a motorised x/y stage intended for a microscope slide, including a traditional microscope frame with a motorised z mechanism and a control box for the stepping motors, may exceed one hundred thousand Swedish kronor.

Another known way of implementing the z movement is to insert a piece of piezoelectric crystal between the objective and its attachment to the microscope. Since piezoelectric crystals have a thickness which is dependent on the voltage applied across the crystal, the objective will be moved in the z direction in connection with voltage changes. The piezoelectric crystal then constitutes both bearing and actuator. Piezoelectric crystals are very rapid but involve high costs, mainly since they require voltages in the size of kilovolt, separate power units and accurate insulation of these live wires. Piezoelectric z drives usually have a range of some hundred micrometers. A greater range requires larger crystals, higher voltages and cascade connection of a plurality of cooperating crystals. The crystal, its encapsulation and the separate power unit make the solution cost tens of thousands of kronor to buy.

A further known way of implementing the z movement is to use the principle of a common electromagnetic loud-speaker coil and an associated permanent magnet, which is usually called voice coil in positioning contexts. There exist, in relation to their mass, very strong and thus very rapid such combinations of coil and magnet. For instance, this principle has been used for many years for focusing and radial fine adjustment in connection with optical scanning of discs in CD/DVD players. The great limitation in connection with use in microscopes is that the coil and the associated objective cannot be allowed, for reasons of vibrations, to float quite freely in the magnetic field of the magnet, which means that some kind of bearing must be applied, which only allows z movements. Moreover a position sensor is necessary, having a resolution of tenths of micrometers, and a control system to make the objective immovable for a time of exposure of, for instance, milliseconds and, if something bumps against the microscope, to be able to return to approximately the same position. If in addition the bearing introduces friction in the form of a so-called stick-slip phenomenon, the z position of the objective will be difficult to control.

One way of performing small precision movements without requiring bearings is to use what is referred to as flexures—"böjorgan" (bending means) in Swedish. Other English expressions are "flexible beam", "flexible sheet", "flexure hinge" and "bending element". Below use is made of the expression bending means to designate a construction element which, by being elastically deformable, allows changes of the relative positions or the relative directions of other construction elements connected to the bending means. Below the term flexure is used for a construction comprising at least one bending means.

Flexures are used, for instance, in precisely the mounting of a voice coil in a CD/DVD player and in equipment for adjustments with nanometer resolution of optical components in laser experiments. An example of products is the so-called NanoMax-TS™ series of triaxial stages from Melles Griot. Their range is far from enough compared with the need for range in x/y of the automatic scanning microscoping that has been described above. The stages of the NanoMax series are also not intended for quick motorisation.

Instead of solving the entire positioning of x/y/z in the automatic scanning microscopes with a single system, it is possible to use a y system and an x/z system. The y system can be solved with a simple mechanism, which is allowed to be slower and which can be monitored by means of the invention disclosed in WO02084368. The x/z system should then give quick movements with sufficient resolution and a sufficiently great range and still be inexpensive and sufficiently stable for microscoping. The range requirements are approx. a factor 10 times greater for x compared with z, while the resolution in x can be allowed to be approx. a factor 100 coarser than the one in z.

A flexure which provides biaxial, i.e. two-dimensional, positioning by means of two cascade-mounted bending means, i.e. mounted in succession, is disclosed in U.S. Pat. No. 4,635,887. The flexure allows small movements in two dimensions perpendicular to each other and its principles would work excellently as an x/z system for an automatically scanning microscope if the range requirements in x would be as small as those in z and if it would be cheap to provide actuators with the fine resolution that is required in z.

SUMMARY OF THE INVENTION

An object of the present invention is to enable a solution to the problems described above. More specifically, example embodiments relate to a microscope system comprising an arrangement for two-dimensional translating positioning of a first platform along a first direction and along a second direction which is perpendicular to the first direction, characterised by a flexure comprising the first platform, a second platform, as well as a first and a second bending means, which connect the first platform to the second platform, the first and the second platform being relatively offset along the second direction, the bending means being relatively offset along the first direction, the bending means being arranged to be bent around a third direction, which is perpendicular both to the first direction and to the second direction, a first actuator, which has an adjustable first length along the first direction and is connected to the first platform at a first point, and a second actuator, which has an adjustable second length along the first direction and is connected to the flexure at a second point. Conceivable embodiments are defined in the dependent claims.

One of the advantages of an arrangement according to example embodiments is that it allows translating positioning, without play, with a relatively great range in the x direction, the first direction, with the resolution that can be given by the actuators while at the same time the arrangement, in a much smaller range in the z direction, the second direction, can give a resolution which is the smallest of the resolutions of the first and the second actuator divided by a gear ratio which is higher than 1. As a result, both the first and the second actuator can be inexpensive and also adapted to the relatively coarse resolution that is required in the x direction, while the resulting resolution in the z direction nevertheless satisfies its much more stringent requirements.

The gear ratio is provided by the arrangement according to example embodiments using bending means in a new manner. Example embodiments use, inter alia, what is normally undesirable movements of the bending means, i.e., both actuators according to example embodiments are directed to act along the same direction means that the movements caused by the actuators in the bending means can cooperate with each other and compensate for each other and also that it is made possible to minimize undesirable turning of the positioned object.

BRIEF DESCRIPTION OF FIGURES

The present invention will now be described by way of embodiments and with reference to the accompanying drawings, in which.

DESCRIPTION OF AN EMBODIMENT

Construction of the Flexure

Figure 4:
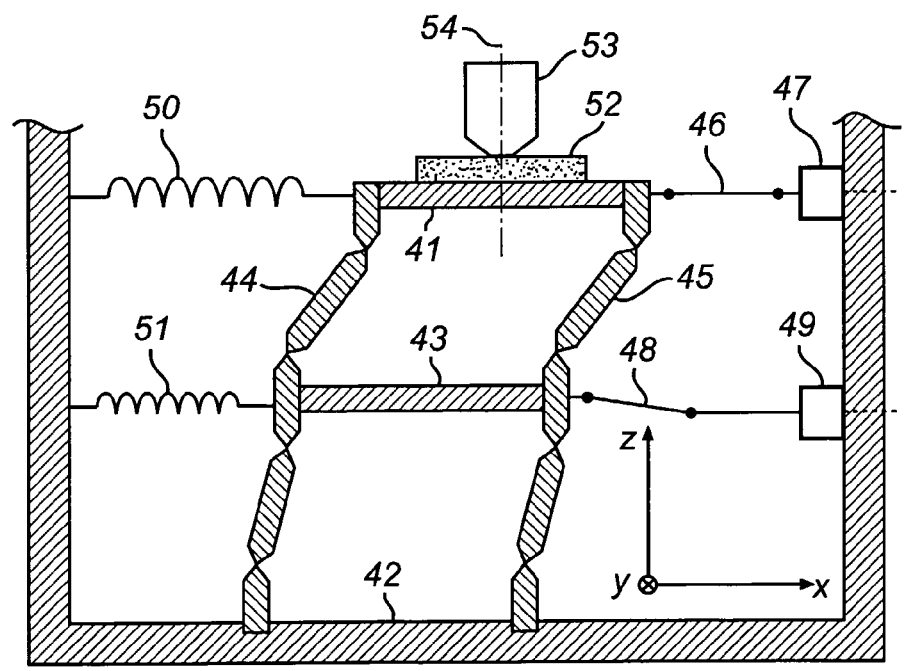
FIG. 4 shows an example of parts of a microscope comprising a flexure according to a first embodiment of the present invention.

FIG. 4 shows an example of parts of a microscope system comprising a flexure according to the present invention. No y mechanism is shown in the example. Moreover no lighting or camera is shown. The objective 53 reproduces the object 52 which is fixedly mounted on the first platform 41. The second platform 42, which here also serves as an attachment for the actuators 47 and 49, and also the return springs 50 and 51, constitutes together with the bending means 44 and 45 as well as the first platform 41 and the third platform 43 the actual flexure. All intended bendings of the bending means 44 and 45 occur at the associated hinges in a bending plane which consists of the x/z plane and whose normal is directed along the direction of the y axis. To eliminate the risk of the linear actuators jamming when the first platform 41 or the third platform 43 is not positioned just opposite the respective actuators in the z direction, the link mechanisms 46 and 48 are capable of taking up position deviations in the z direction. The return springs 50 and 51 allow the use of link mechanisms and actuators with a certain play in the x direction by ensuring that the play is always caught in one and the same direction.

The bending means 44 and 45 can be injection moulded from some plastic with suitable hinge properties, such as polypropylene. The mechanical tolerances are not very important, provided that bending means with similar distances between the hinges are matched. The minimum thickness of the hinges is conveniently about a tenth of a millimeter (in the approximate x direction) over a distance of about one millimeter (in the approximate z direction).

Function of the Flexure

Figure 1:
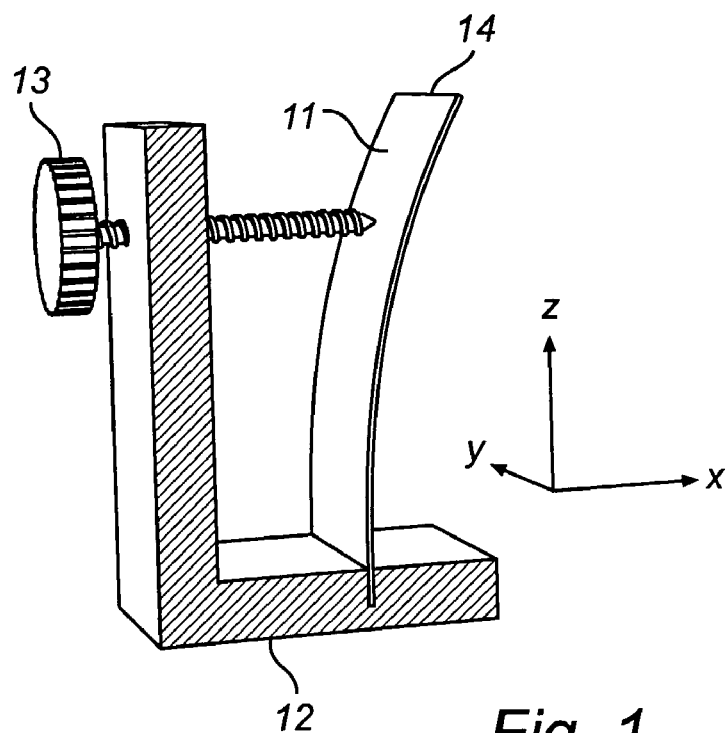
FIG. 1 shows an example of a prior-art flexure principle.

In a very simple embodiment, such as in FIG. 1, a flexure can have as bending means a flexible beam 11 whose one end is attached to a stand 12. By mounting, for instance, an adjusting screw 13 which is threaded in an internal thread in the same stand, the tip of the adjusting screw, which exerts a pressure somewhere along the bending means, can be made to bend the bending means in a bending plane, whose normal is below referred to as bending axis, so that the free end 14 of the bending means is moved. In FIG. 1, the bending axis of the bending means coincides with the y axis. This results in a desired movement of the free end along what is hereinafter referred to as a primary direction, which in this case is the x axis, at the price of a certain, smaller, undesired movement along another direction, which hereinafter is referred to as a secondary direction, which in this case is the z axis and which is perpendicular to the primary direction. The great advantage is that bearings and, thus, friction and play are not to be found in the actual bending means. A further advantage is that the elastically deflected bending means strives to restore its straight shape, and therefore the actuator in the form of the adjusting screw is affected by a returning force whose x component continuously acts in the negative direction of the x axis. Therefore a possible play between the adjusting screw and its internal thread in the stand will all the time be caught in the same direction. This means that no reversing jump occurs in connection with a change of direction of movement of the bending means. Such a flexure can thus take care of the possible play of the actuator in the primary direction of the flexure.

Figure 2:
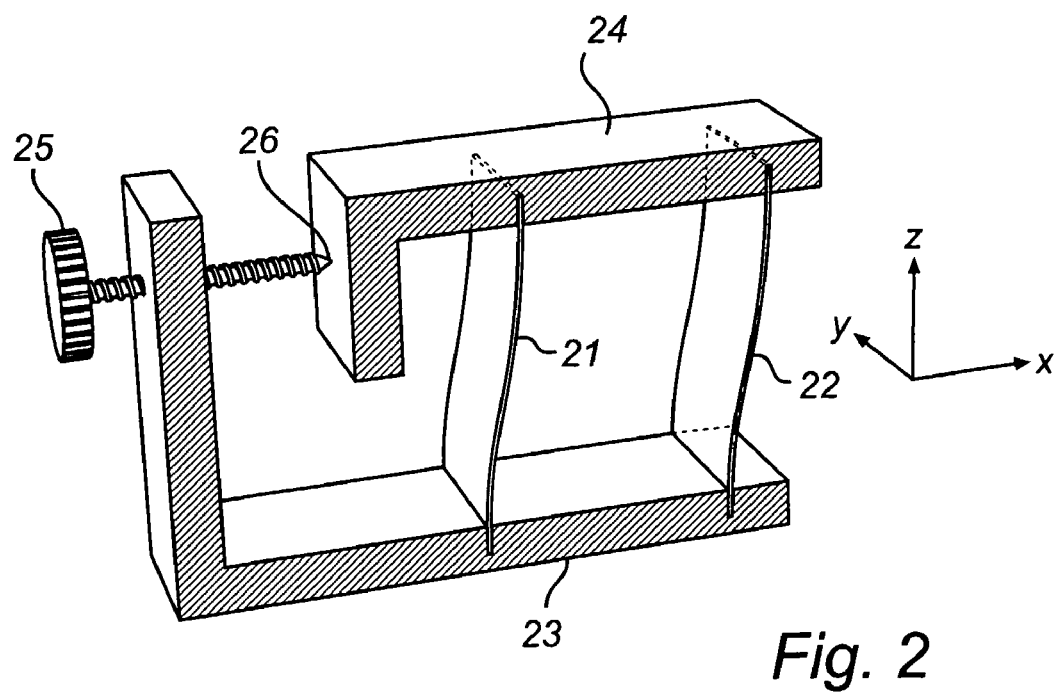
FIG. 2 shows an example of another prior-art flexure principle.

In most cases the bending means is not a separate flexible beam but can, like in FIG. 2, be a parallelogram where two opposite easily flexible sides 21 and 22, respectively, have the same bending axis y while the other two sides 23 and 24, respectively, have a flexibility which in comparison is negligible. Here, too, the desired movement occurs along the x axis and the undesired movement along the z axis. For the two easily flexible sides to have identical torque and force strains, and thus identical deflection geometries, the tip of the adjusting screw 25 should optimally be in contact with a point 26 which in the z direction is positioned halfway between the attachments of the easily flexible sides to the side 23 and the side 24, respectively.

Figure 3:
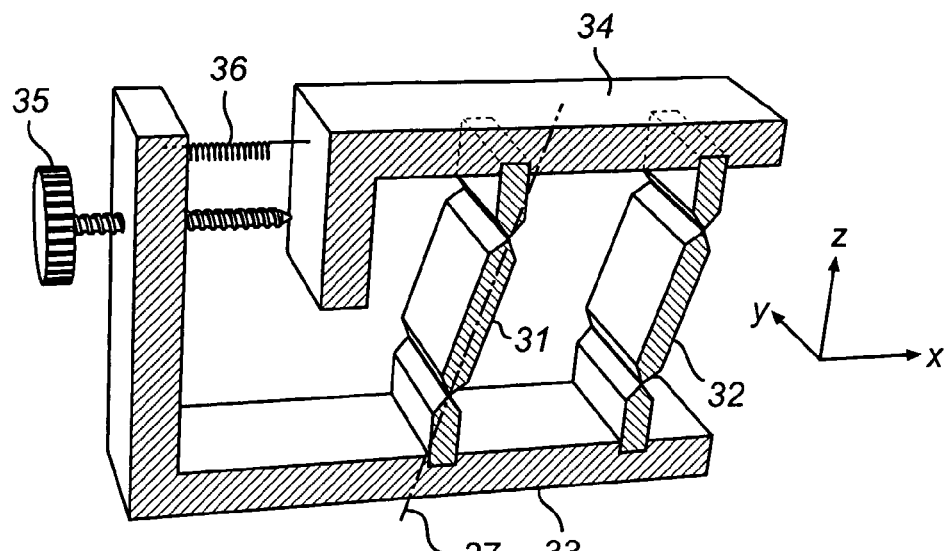
FIG. 3 shows a prior-art variant of the flexure in FIG. 2.

It is quite possible, like in FIG. 3, to replace the continuously flexible sides 21 and 22 of a constant thickness with beams 31 and 32, which are designed so that they are only bent at the associated hinges. The two rigid sides 33 and 34 are of the same type as 23 and 24, respectively. The returning forces of the flexure in FIG. 3 are very small, which may be advantageous from the viewpoint of torque and force balance. However, it is a drawback that the adjusting screw 35 must be double-acting and at the same time free of play, or that a return spring 36 must define the returning force. The position of the spring in relation to the bending means 31 and 32 and in relation to the tip of the adjusting screw 35 is not very important since the bending means 31 and 32 are only subjected to very small forces and torques.

A drawback of the known one-dimensional and many of the two-dimensional flexures is that they can only be used for rather small desired movements in one or more primary directions without the associated undesired movement along another, secondary direction being great.

The size of the movement along a primary dimension is approximately equal to the effective length of the included beams times the sine of the angle of inclination of the centre line of the bending means, which corresponds to the centre line 37 in FIG. 3. The size of the undesired movement is approximately equal to the effective beam length times a factor which is one minus cosine of the same angle of inclination.

U.S. Pat. No. 4,157,818 discloses a two-dimensional flexure where two cascade-mounted bending means each have a primary direction but where both bending means have the same secondary direction. To perform large movements at small angles and, thus, with small undesired movements would require long beams and cause problems with, for instance, reduced rigidity and associated other undesired deflections of the beams.

With multiaxial flexures it is possible to adjust the position in two and three dimensions, respectively. U.S. Pat. No. 4,635,887 discloses a biaxial flexure which can be extended to a triaxial flexure. In its biaxial variant it is made up so that what is the primary direction of one bending means is the secondary direction of another bending means, and vice versa. For the biaxial flexure it is then possible to calculate, or iteratively test and obtain, a 2-tuple of settings of the actuators, which compensates for the fact that for each desired position change there is an undesired such change. The 2-tuple can thus give the desired two-dimensional position.

The difference between a position change in x and how the actuator for x must be changed will be small in relation to the position change in x. The same applies to z. No noticeable gear ratio between actuator changes and corresponding position changes is achieved by that flexure.

The flexure in FIG. 4 is an example of a flexure according to an embodiment of the present invention. It can be said to consist of two cascade-mounted partial flexures. The upper partial flexure consists of the first platform 41, the third platform 43 and, positioned therebetween, parts of the bending means 44 and 45. The lower partial flexure consists of the second platform 42, the third platform 43 and, positioned therebetween, parts of the bending means 44 and 45. Both partial flexures have their primary directions along the x axis and their secondary directions along the z axis.

As a result, the x position of the first platform 41 will consist of the sum, counted by signs, of the deformations of the two partial flexures along the primary flexure direction. The changes in the x position which can be obtained will therefore be of the same size as the deformation changes of the partial flexures. In the way the actuators are arranged in FIG. 4, the upper actuator 47 will fundamentally on its own determine the x position of the first platform. The upper actuator can, if attached to an extension of the third platform, like in FIG. 5, be arranged to control the deformation of the upper partial flexure only.

The z position of the first platform 41 will depend on the sum, counted by signs, of the deformations of the two partial flexures along the secondary direction, which for small angles of inclination are considerably smaller than corresponding deformations along the primary direction. The changes in the z position that can be obtained will therefore be fractions of the deformation changes of the partial flexures along the first direction.

This means that the flexure will have a positioning range which consists of a great possible range of the x position and at the same time a small range of the z position, within which the z position can be selected independently of the x position and while using a gear ratio which allows fine adjustments in the z position with a resolution which is a fraction of the resolutions of the actuators 47 and 49. The present invention thus converts what is otherwise undesired movements along the secondary direction into what gives the gear ratio and thus the finer resolution in the z direction.

Figure 5:
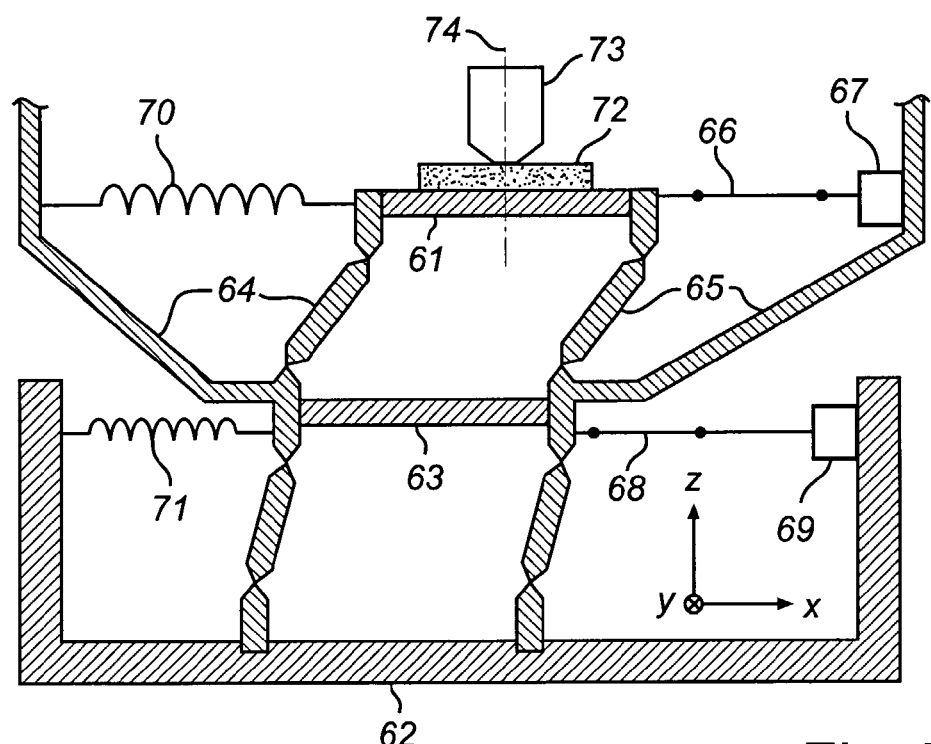
FIG. 5 shows an example of parts of a microscope comprising a flexure according to a second embodiment of the present invention.

In the embodiments in FIG. 4 and FIG. 5, the two bending means are relatively offset along the x direction. Due to the action of the third platform, the relative displacement of the bending means is maintained as the state of the second actuator is changed.

The arrangement comprises few and simple parts, which results in a low production cost, a relatively compact construction and easy maintenance.

That the arrangement in focusing, i.e. in the z positioning, moves the microscope slide, which has a small mass, instead of, as traditionally, the objective, which has a much larger mass, results in considerably less vibration energy being induced in the stand of the microscope.

A further advantage of the objective not being moved is that the objective can then be fixed directly to the stand of the microscope and be immovable relative to the camera of the microscope system. Consequently, it is thus not necessary to use so-called infinity-focused optics, which, because of a larger number of optical elements included, on the one hand is more expensive and on the other contains more error sources than a separate objective with a finite rear focal length.

The arrangement implies that the y positioning is solved by a separate mechanism. Since the y positioning as stated above need not be very quick, it can use a simple mechanism which is controlled according to the principles of WO 02/084368, A1. The y positioning can be implemented by its mechanism allowing y movements of the slide relative to the first platform. The y positioning can also be implemented by its mechanism allowing y movements of the second platform, and thus the entire two-dimensional positioning arrangement, relative to the stand of the microscope.

Lighting

The flexure can, with suitable holes in, for instance, the third platform, comprise a vertical condenser column or be combined with a condenser that is inserted into the flexure in the space between the first 41 and the third 43 platform. The flexure can also be used with reflective lighting, in which case the lighting comes through the objective.

Actuators and their Resolution

The actuators 47 and 49 can be purchased completed, for instance in the form of stepping motors, where the radially innermost part of the shaft of the rotor consists of an internally threaded nut which is accessible from the outside. When the angle of the motor and, thus, that of the nut are stepped, a threaded rod screwed into the nut will move along the shaft of the rotor, provided that the threaded rod cannot rotate by the action of a so-called anti-rotation device. The rod will then move a distance which is the pitch of the thread per turn multiplied by the change in angle counted in turns. Such stepping motors are already available, such as "L5609×2008-M6×0.5" from Nanotec GmbH. Similar motors with built-in anti-rotation are also available.

In connection with a flexure according to the present invention, no separate anti-rotation device is required, provided that the link mechanisms 46 and 48 are sufficiently torsionally rigid. The flexure itself can, since none of its bending axes' even has any component along the x axis, torsionally rigidly resist the torques around the x axis which come from the two actuators via the link mechanisms.

A conceivable inexpensive actuator with a link mechanism can also be composed of an ordinary stepping motor with a homogeneous rotor shaft, an internally threaded sleeve attached to the rotor shaft, one or more lengths of a threaded rod with a suitable pitch, and one or two universal joints.

For instance, a 200 steps stepping motor, an M3×0.5 rod and what is referred to as whole stepping of the stepping motor make it possible to achieve 2.5 micrometers resolution of the actuator. If so-called microstepping is used in the control of the stepping motor, the resolution can be reduced to half, a fourth and even an eighth of the 2.5 micrometers. However, microstepping can be less reliable with great frictional couples, which in this case could be caused by great returning forces of the return springs 50 and 51, respectively.

By flexures with return springs being used and by fast stepping motor actuators being used, the two-dimensional positioning of the microscope slide can be made quick and practically free from reversing jumps and post-oscillations.

Positioning of the Flexure

The position in the x and z direction of the first platform 41 is unambiguously determined by the x positions of the left ends of the link mechanisms 46 and 48. The x positions of said ends are in turn determined unambiguously by the states of the linear actuators 47 and 49. The position of the first platform in the x direction is affected with good approximation only by the state of the first actuator 47. By way of a suggestion, the state of an actuator is defined as the instantaneous distance along the x axis between a point on a part, movable along the x axis, of the actuator and another point on an attachment of the actuator.

Focusing, i.e. adjustment of the z position, can occur in at least two different ways. One way is to use only the first actuator 47. Then only the first platform 41 is moved, and it is only the angle of inclination of the upper partial flexure that is affected. This gives a relatively high gear ratio and, thus, a fine resolution in z. However, the high gear ratio is achieved at the price of a certain undesired movement in x, which probably can be compensated for by assembling consecutive camera images.

Another way is to focus by using only the second actuator 49. Then both the first 41 and the third platform 43 are moved. In general, this way gives a lower gear ratio than the first way stated above. The reason is that the angles of inclination of both partial flexures are changed, which means that both partial flexures will change their extents in the z direction.

Since the two partial flexures are cascade-mounted, these changes will be added, with signs. However, if the centre lines of the bending means in the two partial flexures are inclined in the same direction, one of the partial flexures will, in a method according to this second way, increase its extent in the z direction while the other decreases its extent. The decrease and increase will then, wholly or partly, balance each other, and therefore the result will be a very small movement in z for each movement of an actuator. The gear ratio will thus be high.

What limits the practically usable range in x and z of the arrangement is in the first place not which positions can purely geometrically be achieved, but which gear ratio of the z movement is acceptable. Basically, the more perpendicular to the platforms the centre lines of the bending means are, the higher the gear ratio, i.e. the ratio between a change in length of an actuator and a corresponding change of the z position.

With a distance of, for instance, 40 millimeters between the hinges in a partial flexure and with ±15 degrees maximum angles of inclination of the same, it is possible to obtain a range in x of ±11 millimeters, and within a range of about 600 micrometers in the z direction, obtain gear ratios of the z movement which everywhere are higher than 2, when positioning according to the second way stated above, and higher than 4, when positioning according to the first way stated above. With the same geometry, a gear ratio is obtained, which, within a range of about 300 micrometers in the z direction, everywhere is higher than 6, in positioning according to the first way stated above.

By using combinations of actuators where the two actuators each have a suitably selected resolution, the difference between the states of the first and the second actuator can be varied with a resolution which is lower than the minimum resolution of the individual resolutions of the actuators, provided that the two actuators are used in the z positioning. Such a construction can give a still finer possible resolution in the positioning of z than when using two actuators with the same resolution that are used according to the first and second ways as stated above.

It is quite possible, as a function of the physical measures in one embodiment, to deterministically express how the state of the first actuator 47 depends on the x and z positions of the first platform 41. It is then possible to convert the positions into x and z coordinates for the left end of the link mechanism 46. With knowledge of the geometry of the link mechanism 46, it is then possible to calculate what state the first actuator 47 should have. Given the x and z positions of the first platform 41, there are then two x coordinates of the second actuator 49 that fit. Which two are preferably calculated according to a method for iterative solution of a non-linear equation that describes the problem or quite simply by looking it up in a table. Thus it is quite possible to move, with a single command, which by a calculating means is converted into actuator movements, the first platform 41 from one position in x, z to another desired position in x, z.

During scanning, in connection with fine focusing, it is possible to compare requested changes in the z position with the estimated actual changes in the focus direction, of which what is called an absolute focus measure can make estimates. The comparison can provide valuable information about the state of the flexure. For example, it is possible to make a rough check that the actual positions in x and z, which affect the gear ratio, are the intended ones. Examples of absolute focus measures are given in WO 01/11407, A2 and WO 02/39059, A1.

In FIG. 5, the first actuator 67 is, as mentioned above, mounted so as to follow the movements of the third platform 63 along the first direction. Thus the x position of the first platform 61 along the first direction will depend on the states of both the first 67 and the second 69 actuator. The displacement between the two bending means in the x direction is maintained substantially independently of the state of the second actuator.

Figure 6:
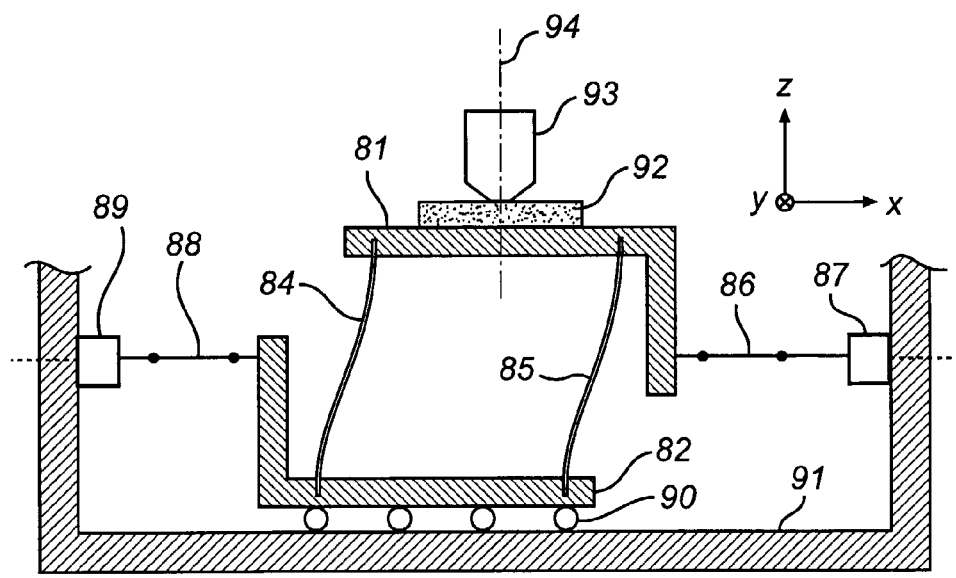
FIG. 6 shows an example of parts of a microscope comprising a flexure according to a third embodiment of the present invention.

FIG. 6 shows an embodiment where the second platform 82 is mounted relative to a stand 91 by a linear bearing 90. The second actuator 89 is connected to the second platform 82, which thus can move relative to the stand 91 at least along the x direction. This embodiment allows a very great x range with a maintained high gear ratio in the z direction. The drawback of this embodiment is that the bearing 90 can cause problems with play and friction. If this embodiment is z positioned according to the first way stated above, i.e. while using only the first actuator 87, the bearing will not have to move during the actual z positioning. Also in this case, the displacement between the two bending means in the z direction is maintained substantially independently of the state of the second actuator.

Figure 7:
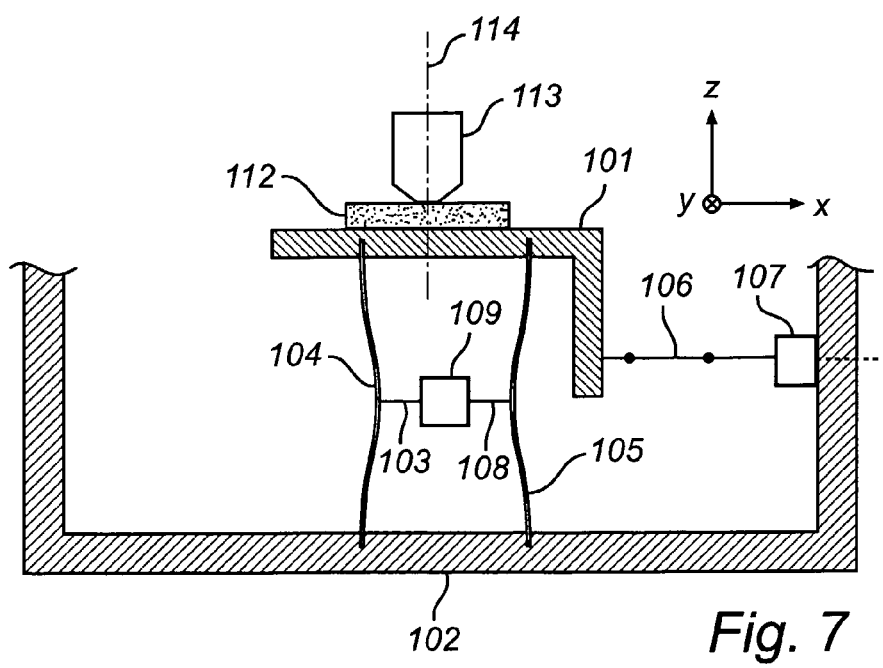
FIG. 7 shows an example of parts of a microscope comprising a flexure according to a fourth embodiment of the present invention.

FIG. 7 shows an embodiment where the second actuator 109 acts directly on the two bending means 104 and 105. Also this flexure can be said to consist of two cascade-mounted partial flexures, which meet each other at the level of the second actuator. As the length of the second actuator is changed, the two bending means will be actuated in different directions. The displacement of the two bending means along the x direction will depend on the state of the second actuator and result in the first platform changing its position in the z direction. The function will be approximately the same as for the flexures shown in FIG. 4 and FIG. 5, although the way of constructing the flexure is different.

Figure 8:
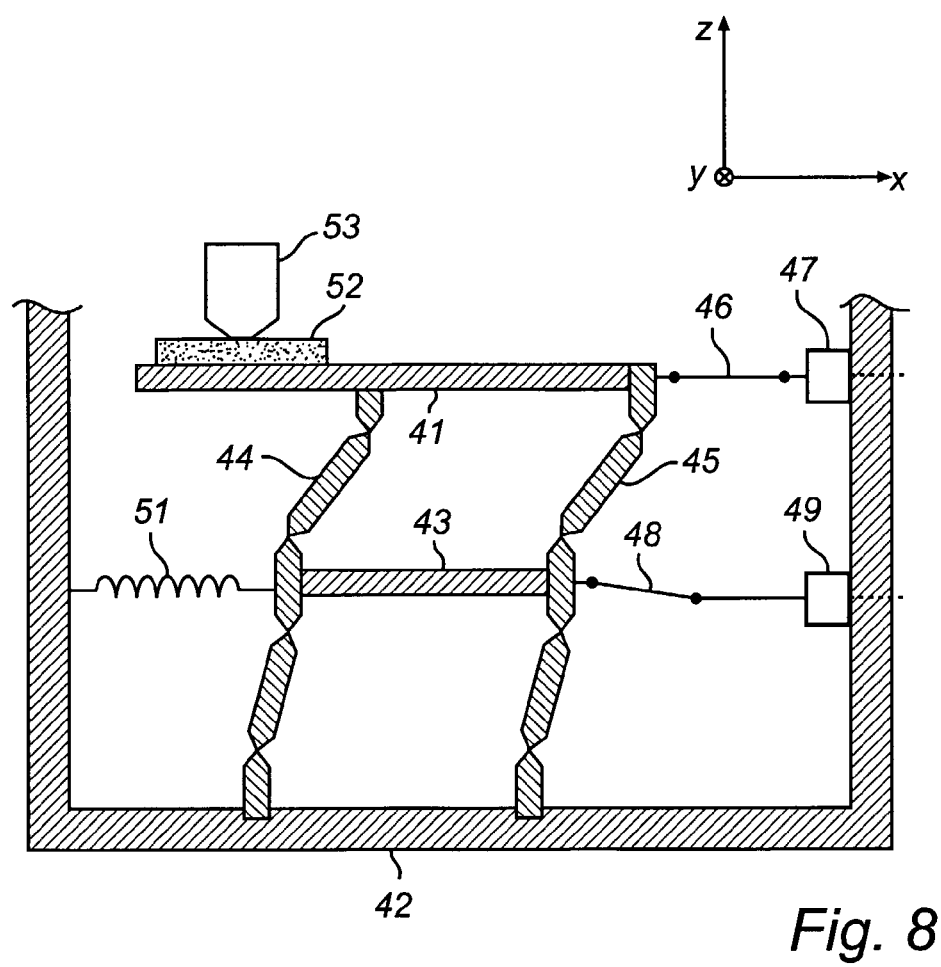
FIG. 8 shows a variant of the flexure arrangement in FIG. 4.

FIG. 8 shows a variant of the flexure arrangement in FIG. 4. Here the first platform 41 has been extended so that the objective 53 and the object 52 can be arranged offset in the lateral direction (x direction) in relation to the bending means 44, 45 and the third platform 43. This means that the object 52 can easily be illuminated from below. In the embodiment in FIG. 4, the illumination of the object may occur, for instance, through an opening in the third platform 43.

It is not necessary to use the same number of separate parts as shown in FIG. 4. For instance, the left bending means 44, the first platform 41 and the right bending means 45 can be made in a single flat piece and be folded before it is mounted on the second and the third platform. A piece containing bending means or platform can be composed by webbings of plastic being injection moulded on a flexible film. The hinges need not be homogeneous in the y direction, i.e. the hinges can be narrower than the whole extent of the bending means in y.

To replace the bending means 44 and 45 by four hinges per bending means with continuously bent beams similar to those in FIG. 2 could, as mentioned above, result in difficulties in providing torque equilibriums in the partial flexures. This means that, for instance, problems with a changed inclination of the first platform could arise. If the flexure is to be used in microscoping, where translating positioning, i.e. positioning without turning of the first platform and the object 52 connected thereto, is desired, such changes in inclination could result in the condition that not the entire microscope image will be sharp at the same time. Continuously bent beams can, however, be so much easier to manufacture that for some applications they can still be preferred to bending means with hinges, for instance in connection with a flexure according to the embodiment in FIG. 6, for which the torque equilibrium is no problem.

In FIG. 4 the flexure is upright. This is advantageous since there is much space in all directions above the upper side of the first platform, which is appropriate if the microscope system is to be equipped with a revolver for two or more objectives. However, it is a drawback that at least parts of the lighting arrangement must be accommodated in the space that is defined by the bending means and the three platforms.

The flexure can also be suspended, in which case the construction, except the objective 52 and the microscope slide 52, will be like in FIG. 4 but turned upside down. The holes in the platforms will then accommodate objectives instead of lighting like in the upright flexure.

The y mechanism can be implemented with a third partial flexure. It then has, of course, y as the primary direction, while its secondary direction can be selected freely in the x/z plane. If z is selected as the bending axis, x will be the secondary direction, which is the direction that has access to the largest possible range for compensation of the undesired movements.

The invention claimed is:

1. A microscope system, comprising:
an arrangement for two-dimensional translating positioning of at least one platform along a first direction and along a second direction perpendicular to the first direction, the arrangement being a flexure arrangement including:
a first platform, a second platform, and a third platform; and
a first bending device and a second bending device, each of the first and second bending devices connecting each of the first, second and third platforms,
wherein the first and second bending devices are relatively offset along the first direction with respect to each other and arranged to be bent around a third direction, perpendicular both to the first direction and to the second direction, and at least one of the first, second, or third platform is stationary.

2. A microscope system as claimed in claim 1, wherein an object is fixedly connected to the first platform.

3. A microscope system as claimed in claim 1, wherein an object is fixedly connected to the first platform along the first and the second directions but movable along a third direction.

4. A microscope system as claimed in claim 1, wherein at least one bending device is integral with one of the platforms.

5. A microscope system as claimed in claim 1, wherein at least one bending device includes at least one hinge.

6. A microscope system as claimed in claim 1, wherein primary deflections of the first and second bending devices occur along the first direction and secondary deflections occur along the second direction.

7. A microscope system as claimed in claim 1, wherein the second direction substantially coincides with an optical axis in an optical imaging system in the microscope system.

8. A microscope system as claimed in claim 1, further comprising:
a first actuator including an adjustable first length along the first direction and connected to the first platform; and
a second actuator including an adjustable second length along the first direction and connected to the third platform.

9. A microscope system as claimed in claim 8, wherein the second actuator is connected to the first and the second bending devices in such a manner that a relative displacement between the first and the second bending devices along the first direction is substantially maintained independently of changes of the second length.

10. A microscope system as claimed in claim 9, wherein the third platform is positioned between the first and the second platform.

11. A microscope system as claimed in claim 10, wherein the first actuator includes an attachment, the position of which along the first direction has a constant difference compared with a third point of the third platform.

12. A microscope system as claimed in claim 8, wherein the first or second actuators affect the flexure arrangement in such a manner so as to perform arbitrary movements of the first platform along the first and second directions.

13. A microscope system as claimed in claim 8, wherein at least one of the actuators is connected to at least one of the first platform, the second platform, the third platform, the first bending device, and the second bending device via a link mechanism, which allows relative position changes along the second direction.

14. A microscope system as claimed in claim 8, wherein the flexure arrangement is configured so that the first and the second platforms are substantially parallel independently of the first and the second lengths.

15. A microscope system as claimed in claim 8, wherein a first change of one of the first and the second length causes a second change of the position of the first platform along the second direction, and that a gear ratio, defined as the sum of the first change divided by the sum of the second change, at least for a first number of combinations of first and second lengths, is higher than 1.

16. A microscope system as claimed claim 15, wherein the gear ratio is higher than 2.

17. A microscope system as claimed in claim 15, wherein the gear ratio is higher than 4.

* * * * *